No. 877,950. PATENTED FEB. 4, 1908.
C. L. RIKER, Jr.
BORING BAR.
APPLICATION FILED MAR. 15, 1907.
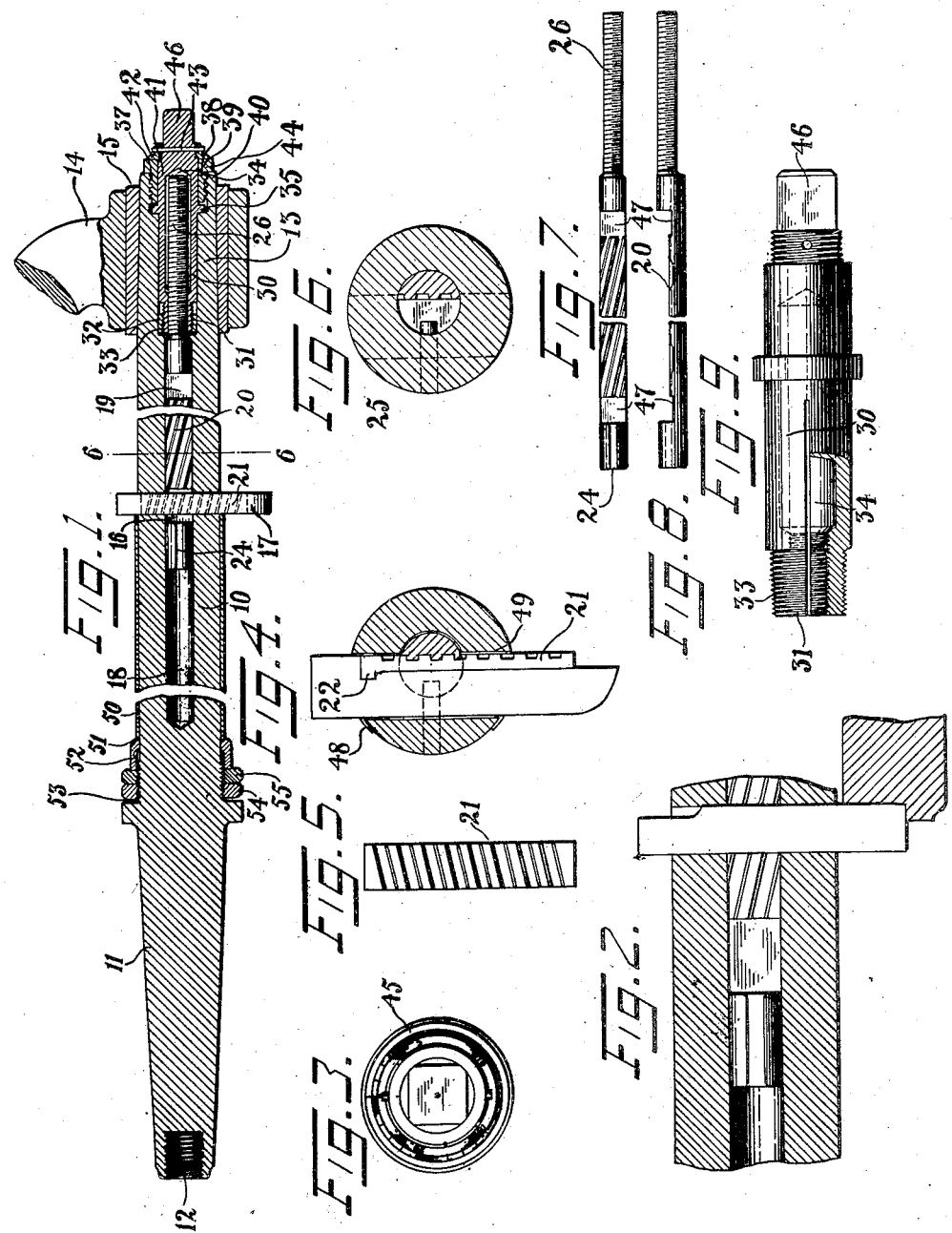
Witnesses.
M. Levy
F. Kohlberger
Inventor:
Carroll L. Riker, Jr.
By his Attorney.
F. H. Richards.

UNITED STATES PATENT OFFICE.

CARROLL L. RIKER, JR., OF NEW YORK, N. Y.

BORING-BAR.

No. 877,950.  Specification of Letters Patent.  Patented Feb. 4, 1908.

Application filed March 15, 1907. Serial No. 362,498.

*To all whom it may concern:*

Be it known that I, CARROLL LIVINGSTON RIKER, Jr., a citizen of the United States, residing in New York, in the county of Kings and State of New York, have invented certain new and useful Improvements in Boring-Bars, of which the following is a specification.

This invention relates to boring bars and particularly to the manner of securing and adjusting the cutter carried by the bar. This bar is not only useful in connection with milling machines, but with boring machines generally and also wood working tools.

The invention comprises mechanism for controlling the cutter; that is advancing or retracting it not only preliminary to making a cut, but also to do this precisely during the time the cut is being made.

In the drawing accompanying and forming a part of this specification Figure 1 is a longitudinal section of the boring bar equipped with my present improvement. It is shown here in connection with a portion of a steady bar or steady arm. Fig. 2 is an enlarged view of a portion of the device illustrated in Fig. 1 showing the cutter and the sliding key for advancing and retracting the cutter. Fig. 3 is an enlarged end view looking at the bar from the right hand end of Fig. 1. Fig. 4 is a cross section through Fig. 2. Fig. 5 is a front view of the cutter rack. Fig. 6 is a view similar to Fig. 4. Figs. 7 and 8 are views in transverse positions of the sliding key for controlling the cutter; and Fig. 9 is a side view of the split thimble for engaging the sliding key.

The boring bar or the main portion of this is designated in a general way by 10 and is shown as having a tapered end 11 for engaging a chuck, and a screw-threaded socket 12 for a set screw for holding it in the socket of the chuck. This of course is merely illustrated to show the chuck engaging feature which does not form a part of the present improvement. The other end of the bar is also shown as having a tapered end 13 which will be supported at times by the end of the steady arm 14 and may be held in place in the steady arm by a tapered bushing 15. This also is merely shown for the purpose of illustrating the general surroundings of the structure. The bar is shown as having a cutter opening 16 through it for receiving a cutter 17 and it is principally with the advancing and retracting of this cutter from and toward the axis of the cutter bar that the present invention is concerned. The boring bar has a longitudinally disposed cavity 18 for receiving an actuator for the cutter. Within the cavity 18 is located a sliding key, designated in a general way by 19, and which carries a rack 20 having slanting teeth, in the present instance illustrated at an angle of about 15 degrees. The cutter opening 16 passes through or intercepts the cavity 18 which cavity in the present instance is shown concentrically disposed within the bore in the bar.

The cutter carries teeth, in the present illustration its body has a recess within it for receiving the cutter rack 21 which has slanting teeth mating with the teeth on the rack 20. These teeth are at rather an acute angle to the normal so that the parts will operate easily. Accurate adjustment is rendered possible with this form of rack, a relatively long movement of the actuator being required for effecting a short movement of the cutter. The rack 21 is shown as comparatively thin and having a nose 22 for engaging a socket in the cutter. Upon the reciprocation of the sliding key the sliding engagement between the slanting teeth of the racks 20 and 21, will reciprocate the cutter, in the present instance transversely to the direction of the movement of the sliding key. The sliding key has at one end a groove 24 for running on pins 25 in the cavity 18. This will prevent rotation of the key. The shank 26 of the key is screw threaded and this is so off-set from the body of the sliding key that it will be eccentrically disposed relative to the boring bar as a whole.

A split thimble illustrated in Fig. 9 and designated in a general way by 30 has a screw-threaded end 31 for engaging the screw-threaded shank 26 and an adjusting nut 32 will engage the outer screw-threaded portion 33 of end 31 of the split thimble for the purpose of taking up wear. A chamber 34 is provided inwardly of the screw-threaded portion 31 so that the length of the screw-threaded end 31 may not be excessive although the device is adapted to traverse a considerable screw-threaded length of the shank 26. The thimble has fast upon it a collar 35. The end of the boring bar beyond the shoulder is provided with a coarse screw-thread 37 with which the screw-thread carried by a thimble nut 38 will engage. The head 39 of the thimble nut engages a shoulder 40 formed on the outer end of the boring bar body. This nut embraces a portion 41 of the thimble 30 and is held between the shoulder 35 and a collar 42 which is pinned upon a portion 43 of the thimble 30. The thimble nut may have a wrench engaging head 44, and the collar may have a scale 45 applied to it. The split end of the thimble 30 is shown as having a wrench engaging portion 46 whereby it may be turned.

There is a clear or blank space indicated at 47 at each end of the rack 20 and this will permit the removal of the cutter and the rack 22 at either end of the limit of movement of the rack 20 so that if the rack is moved to the full extent of its movement and still the tool is not adjusted to the extent desired the tool may be released from the rack and moved by hand to about the desired position and then caused to engage the rack. The tool is steadied by means of a spring slot facing 48 upon one side and a spring slot facing 49 which engages the rack and is bowed around the sliding key. This will prevent the tool from slipping during periods of adjustment and when it has not been locked in position, and also furnishes a hard facing which may be renewed when worn.

The means for locking the tool in position in the present instance is shown as comprising a sleeve 50 mounted upon the bar and adapted to clasp the cutter when moved toward the cutter. For moving the sleeve 50 toward and against the cutter a collar 51 having a working fit with the bar and engaging the end of the sleeve is provided, and there is a flange portion 52 of this collar large enough to pass over the screw threads 53 upon the bar, which screw threads are engaged by a pair of nuts 54—55 for advancing the collar and sleeve and for locking the same in their positions of adjustment. This may be adjusted so as to afford sufficient clamping to produce the desired ease of working fit or may be advanced with sufficient firmness against the cutter to clamp the same in position.

The operation of the invention is substantially as follows: When the bar has been placed in position in the machine with which it is intended to be used, as for instance having the engaging end 11 properly seated in some suitable form of chuck, and if occasion may demand, having the end 13 supported by the steady arm of the machine, the work having previously been placed with the bar passing through that opening of it which is to be bored, the tool will be advanced to approximately the proper distance by rotating the split thimble 30 by means of its wrench engaging portion 46, and then micrometer adjustment will be had by rotating the thimble nut 38. The engagement between the racks 20 and 21 will cause a movement of the cutter inward or outward as occasion may demand. After the cutter has been moved to the proper position it may be located by advancing the sleeve 50 against it, the advance of the sleeve being effected by the nuts 54—55.

Although Fig. 4 shows a boring cutter, yet it will be apparent that this invention is equally useful in connection with facing cutters and other tools which may be mounted upon a boring bar.

When it is desired to slightly change the position of the tool the split thimble will be rotated and the racks will slide one in the other and advance or retract the tool as occasion may demand. When considerable movement is required of the tool, or it is desired to remove the tool, and it would require a great many rotations of the split thimble to effect the desired movement of the tool, it will merely be necessary to unscrew the screw thimble 38, slide the sliding key out of the bar, effect the proper adjustment, and replace the parts in position, after which the micrometer adjustment may be effected by means of rotating the split thimble.

Having described my invention I claim:

1. The combination in a boring bar, of a bar member having an axially disposed chamber, a key slidable in said chamber, means for preventing the rotation of the key, said key having tool engaging faces, said bar being provided with a tool seat transversely disposed to said chamber, a tool carrying key engaging faces mounted in said tool seat and engaging the said faces on the sliding key, said key having a shank provided with a screw thread, a split thimble having a chamber within it for receiving said shank and having a portion of the walls of such chamber screw threaded for engagement with said screw thread, the split in said thimble extending through said screw threaded portion, a clamping nut for binding said split thimble upon the shank of the key, a screw threaded thimble rotatably mounted upon the end of the split thimble and prevented from reciprocation thereon and having screw threaded engagement with the boring bar.

2. The combination in a boring bar, of a bar member having an axially disposed chamber, a key slidable in said chamber, means for preventing the rotation of the key, said key having slanting rack teeth upon it and open spaces at the ends of the rack teeth, said bar being provided with a tool seat transversely disposed to said axial chamber, a tool carrying rack in said tool seat for engaging with the rack on the sliding key, and means for actuating said key.

3. In a boring bar, the combination of a bar member having an axially disposed cavity, a sliding key mounted in said cavity and provided with rack teeth disposed at an acute angle to the normal, said bar and key carrying coöperative means for preventing the rotation of the key and said key having a screw threaded shank longer than said rack, a toolway passing through the bar and intersecting the cavity therein, a tool mounted in said toolway and provided with a socket, a rack engaging said tool and having a nose seated in said socket, said rack having teeth for mating with the teeth upon said key and said key having at the ends of the rack spaces for permitting the disengagement of the racks, and means for actuating said sliding key.

4. In a boring bar, the combination of a bar member having a cavity, the open end of said cavity being enlarged and having a coarse screw thread upon its walls, a sliding key mounted in said cavity and provided with tool engaging faces, a toolway passing through the bar and intersecting the cavity therein, a tool mounted in said toolway and provided with faces for engaging the faces on the key, a split thimble having a chamber within it for receiving the screw threaded shank of the key and provided at its end with a screw thread for engaging said screw threaded shank and provided exteriorly of such screw threaded portion with a screw thread, such thimble being split longitudinally through the portion provided with said screw threads, and a binding nut for engaging said external screw threads of the split thimble, said thimble being provided with a wrench engaging portion, a screw threaded thimble mounted upon said split thimble for rotation, a pair of collars fast upon said split thimble and engaging the ends of said screw threaded thimble for preventing the longitudinal movement of said split thimble, said screw threaded thimble being provided with coarse threads engaging those on the end of the cavity in the bar member.

Signed at Nos. 9 to 15 Murray street, New York, N. Y., this 2nd day of March, 1907.

CARROLL L. RIKER, Jr.

Witnesses:
FRED. J. DOLE,
HENRY E. GREENWOOD.